United States Patent [19]

Sakai

[11] Patent Number: 4,544,935
[45] Date of Patent: Oct. 1, 1985

[54] RECORDING APPARATUS
[75] Inventor: Katsuo Sakai, Yokohama, Japan
[73] Assignee: Ricoh Company, Ltd., Japan
[21] Appl. No.: 386,912
[22] Filed: Jun. 10, 1982
[30] Foreign Application Priority Data Jun. 11, 1981 [JP] Japan ............................ 56-88902

[51] Int. Cl.⁴ ............................................ G01D 15/06
[52] U.S. Cl. .................... 346/155; 355/3 DD; 355/3 TR
[58] Field of Search ............... 355/3 R, 3 CH, 3 TR, 355/3 DD; 346/153.1, 155

[56] References Cited

U.S. PATENT DOCUMENTS

| | | | |
|---|---|---|---|
| 3,441,938 | 4/1969 | Markgraf | 346/153.1 X |
| 4,227,452 | 10/1980 | Tamai | 346/153.1 X |
| 4,402,000 | 8/1983 | Fabel et al. | 346/153.1 X |
| 4,446,471 | 5/1984 | Yano | 355/3 TR X |

Primary Examiner—Fred L. Braun
Attorney, Agent, or Firm—Guy W. Shoup

[57] ABSTRACT

A recording apparatus has a donor roller which is driven to rotate at a first peripheral speed and has a layer of uniformly charged fine toner particles, a multi-stylus recording head for forming a charge pattern on the toner layer, and a transfer roller which is rotated opposite in direction to the donor roller and at a second peripheral speed which is slower than the first peripheral speed. A recording medium is advanced between the donor and transfer rollers at a speed equal to the second peripheral speed, whereby a transferred toner image of increased density is obtained.

16 Claims, 11 Drawing Figures

RECORDING APPARATUS

BACKGROUND OF THE INVENTION

1. Field of the Invention

This invention relates to a recording apparatus applicable as an output device of a computer, facsimile and the like. More in particular, the present invention relates to a transfer type recording apparatus capable of controlling image density without increasing energy consumption and complication in structure.

2. Description of the Prior Art

The recording process of the type which carries out the steps of forming a toner layer of a predetermined thickness, forming an electrostatic latent image on the thus formed toner layer and transferring the latent image onto a recording medium is well known in the art. One such example is disclosed in the Japanese Laid-open Publication No. 55-84955.

In accordance with the process disclosed in the above-mentioned publication, a toner layer uniformly charged to a first polarity and having a predetermined thickness is formed on the surface of a donor roller which is driven to rotate at a constant speed. Then the toner layer is selectively charged to a second polarity opposite to the first polarity thereby forming an electrostatic latent image. Thereafter, the latent image is transferred onto a transfer or recording medium thereby forming a visible toner image thereon. Such a recording process is quite advantageous since it is simple and easy to carry out.

It has however been required to further improve the control over image density of a reproduced image. It is true that image density may be increased by applying an increased recording potential. But, this will also increase power consumption and require the provision of a higher power unit, which is economically disadvantageous. Thus, there has been a need for improving the control over image density of a reproduced image without significantly increasing the level of power consumption.

SUMMARY OF THE INVENTION

In accordance with one aspect of the present invention, there is provided a recording apparatus which comprises a first roller for carrying toner on the peripheral surface thereof, said first roller being driven to rotate at a first peripheral velocity; means for forming a toner layer on the surface of said first roller, said toner layer being charged to a first polarity and having a predetermined thickness; a recording head for selectively recharging said toner layer with a second polarity opposite to said first polarity thereby forming an electrostatic latent image having a desired charge pattern; and a second roller disposed in parallel with said first roller and driven to rotate in the direction opposite to that of said first roller at a second peripheral velocity which is different from said first peripheral velocity, whereby a transfer medium may be passed between said first and second rollers at said second peripheral velocity thereby transferring said latent image onto said transfer medium.

In accordance with another aspect of the present invention, there is provided a recording apparatus which comprises: a first roller for carrying toner on the peripheral surface thereof, said first roller being driven to rotate at a first peripheral velocity; means for forming a toner layer on the surface of said first roller, said toner layer being charged to a first polarity and having a predetermined thickness; a recording head for selectively recharging said toner layer with a second polarity opposite to said first polarity thereby forming an electrostatic latent image having a desired charge pattern; a second roller disposed in parallel with said first roller and driven to rotate in the direction opposite to said first roller at a second peripheral velocity thereby transferring said latent image onto the peripheral surface of said second roller to form a visible image; and a third roller disposed in parallel with said second roller and driven to rotate in the direction opposite to said second roller at a third peripheral velocity, whereby a transfer medium may be passed between said second and third rollers thereby transferring said visible image on said second roller to said transfer medium.

In accordance with a further aspect of the present invention, there is provided a recording apparatus which comprises: a toner carrier which is driven to move along a predetermined path through a transfer region at a first velocity; means for forming a toner layer on the surface of said toner carrier, said toner layer being charged to a first polarity and having a predetermined thickness; a recording head for selectively recharging said toner layer with a second polarity opposite to said first polarity thereby forming an electrostatic latent image having a desired pattern; and means for advancing a transfer medium at a second velocity other than said first velocity through said transfer region where said electrostatic latent image is transferred onto said transfer medium.

It is therefore an object of the present invention to provide an improved recording apparatus.

Another object of the present invention is to provide a recording apparatus capable of setting the image density of a reproduced image at a desired value.

A further object of the present invention is to provide a recording apparatus capable of improving image density of a reproduced copy without complication in structure and increase in power consumption.

A still further object of the present invention is to provide a recording apparatus which is simple in structure and thus easy to manufacture.

A still further object of the present invention is to provide a transfer type recording apparatus which may be adapted for use as an output device of a computer, facsimile and the like.

A still further object of the present invention is to provide a recording apparatus effective in avoiding the occurrence of background contamination.

Other objects, advantages and novel features of the present invention will become apparent from the following detailed description of the invention when considered in conjunction with the accompanying drawings.

BRIEF DESCRIPTION OF THE DRAWINGS

FIGS. 6(a) through 6(d) are schematic illustrations showing how a reproduced image is obtained from an original image in accordance with the present invention.

DESCRIPTION OF THE PREFERRED EMBODIMENTS

Figure 1:
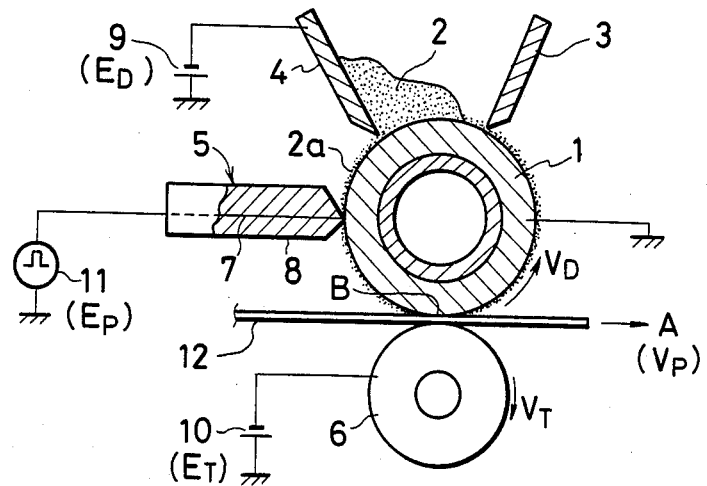
FIG. 1 is a schematic illustration showing one embodiment of the recording apparatus in accordance with the present invention.

Referring now to FIG. 1, the recording apparatus comprises a donor roller 1 which is journaled to a machine frame (not shown). The donor roller 1 is comprised of a material having a relatively low resistivity and it is driven to rotate in the direction indicated by the arrow with a peripheral or recording velocity $V_D$. Along the periphery of and in the rotating direction of the donor roller 1 are disposed a hopper 3 for containing therein a quantity of toner 2 having high resistivity, a doctor blade 4 which is urged against the donor roller 1, a multi-stylus recording head 5 urged against the donor roller 1, and a transfer roller 6.

Preferably, the donor roller 1 is comprised of silicon rubber having volume resistivity of about $10^5 \Omega.cm$, hardness of about 45°HS, and surface roughness of about 5μm or lower. The doctor blade 4 is preferably comprised of phosphor bronze and a negative potential is applied to the doctor blade 4 by means of a voltage source 9 ($E_D$). Thus, as the donor roller 1 rotates, on the peripheral surface of the donor roller 1 is formed a toner layer 2a the thickness of which is determined by the doctor blade 4. Moreover, since a negative potential is applied to the doctor blade 4 and the donor roller 1 is grounded, the toner layer 2a is charged to a negative polarity. It is to be noted that in the embodiment shown in FIG. 1, the doctor blade 4 constitutes a sidewall of the hopper 3. Although it is not shown, a spring may be provided to bring the tip of the doctor blade 4 in resilient contact with the donor roller 1.

The multi-stylus recording head 5 includes a plurality of recording electrodes 7 arranged spaced apart from one another along the periphery of and in parallel with the axis of rotation of the donor roller 1. These recording electrodes 7 are embedded in an insulating support 8 except their forward ends which are exposed and in contact with the toner layer 2a. Each of the recording electrodes 7 is connected to receive a recording signal (positive polarity) in the form of a pulse from a signal source 11. As described above, the toner layer 2a is uniformly charged to a negative polarity. However, since a positive pulse signal is applied to the recording head 5, the toner layer 2a is selectively recharged to a positive polarity thereby forming a desired charge pattern or an electrostatic latent image in the toner layer 2a.

Then the toner layer 2a in which a latent image is formed is brought to a transfer region B as the donor roller 1 rotates. The transfer roller 6 is provided in parallel with the donor roller 1 and driven to rotate in the clockwise direction with a peripheral or transfer velocity $V_T$. The transfer roller 6 may be provided in contact with or as spaced apart from the donor roller 1. Preferably transfer paper 12 is passed in pressure contact between the rollers 1 and 6 as indicated by the arrow A in order to obtain an increased transfer efficiency. In this case, if the recharging is so conducted that the latent image is formed by selectively neutralizing the toner layer 2a which has been uniformly charged by the doctor blade 4, the latent image having no charge may be transferred onto the transfer paper 12 while the background portion which is charged to negative polarity will stay stuck to the donor roller 1.

On the other hand, as shown in FIG. 1, in a preferred mode of the present invention, a negative potential is applied to the transfer roller 6 by means of a voltage source 10 ($E_T$). In this case, it is preferable that the latent image be formed by selectively recharging the toner layer 2a, which has been charged to the negative polarity by the doctor blade 4, to the positive polarity. The positive latent image will be electrostatically attracted onto the transfer paper 12.

The latent image thus transferred onto the transfer paper 12 is then fixed thereto by a fixing device (not shown). On the other hand, the background toner remaining on the peripheral surface of the donor roller 1 after transfer will be collected into the hopper 3.

With a structure described above, the image density of a reproduced image formed on the transfer paper 12 is proportional to the amount of charge or charge-to-mass ratio (Q/M) of the toner after having been recharged by the recording head 5. With a constant recording velocity $V_D$ or peripheral velocity of the donor roller 1, the charge-to-mass ratio (Q/M) is proportional to the pulse width of the recording pulse signal $E_P$.

Figure 2:
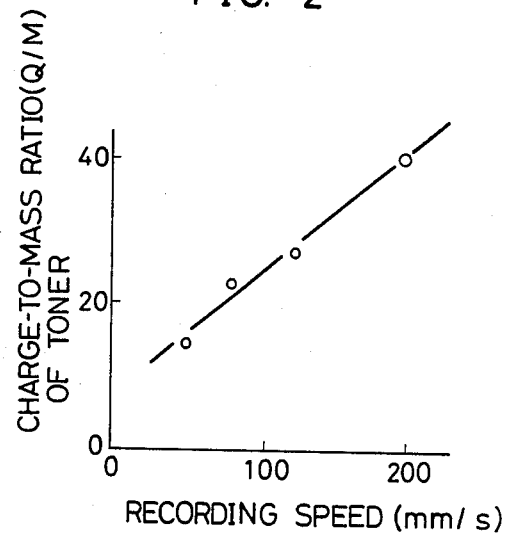
FIG. 2 is a graph showing an experimentally obtained linear relationship between the recording speed or peripheral speed of the donor roller 1 and the charge-to-mass ratio of the toner.

However, it has been found by the present inventor that the charge-to-mass ratio (Q/M) has a linear relationship with the recording velocity $V_D$ where the pulse width of a recording pulse signal is kept constant, as shown in FIG. 2. The experimental result shown in FIG. 2 was obtained by employing a recording pulse signal having a pulse height of 100V. and a pulse width of 10 m.sec. With the foregoing in mind, it will be understood that the image density of a reproduced image formed on the transfer medium 12 may be varied by changing the recording velocity or peripheral velocity of the donor roller 1. In particular, if it is desired to increase the image density, it is only necessary to increase the recording or peripheral velocity $V_D$. When the recording velocity $V_D$ is increased, the toner layer 2a will be charged more and thus the transferred image formed on the transfer medium 12 will have an increased image density. It is to be noted that when the recording velocity $V_D$ is increased from a reference value, the latent image formed in the toner layer 2a will be expanded along the circumference of the donor roller 1. However, by maintaining the transfer velocity or peripheral velocity $V_T$ of the transfer roller 6 and thus the advancing velocity $V_P$ of the transfer medium 12 intact at a reference value, the expanded latent image will be reduced to the original size when transferred onto the transfer medium 12.

Accordingly, it is preferable that the frictional force between the transfer roller 6 and the transfer medium 12 is set much greater than that between the donor roller 1 and the transfer medium 12. In this case, there is substantially no slip between the transfer roller 6 and the transfer medium 12; on the other hand, the donor roller 1 slips on the transfer medium 12. Under the circumstances, the transfer medium 12 moves in the direction indicated by the arrow A with the advancing velocity $V_P$ which is substantially equal to the peripheral velocity $V_T$ of the transfer roller 6. If the transfer velocity $V_T$ and thus the advancing velocity $V_P$ is increased from a reference value, the image formed on the transfer medium will be expanded in the advancing direction of the transfer medium 12; whereas; if the transfer velocity $V_T$ is decreased from a reference value, the transferred image will be reduced in size in the advancing direction.

It should also be noted that when the recording speed $V_D$ is set at a value higher than a reference value, it is preferable to set the recording length of the recording electrodes larger than a reference length. Here the recording length is defined as a length of the end surface of the recording electrodes of the multi-stylus recording head 5 in the direction of relative motion between the donor roller 1 and the head 5. Assuming that the recording length has a reference length when the recording velocity $V_D$ has a reference velocity, when the recording velocity $V_D$ is set at a value determined by multiplying a positive real number to the reference velocity, it is most preferable that the recording length is set at a value substantially determined by multiplying the positive real number to the reference length.

Stated more in detail, let us assume that the recording length L has a reference value L' when the recording velocity $V_D$ has a reference value $V_D'$. Then, in accordance with the principle of the present invention, the recording length L should be set at a value substantially equal to 2L' when the recording velocity $V_D$ is set at $2V_D'$. By so doing, the image density of a reproduced image formed on the transfer medium 12 may be remarkably increased. It is to be noted that contributions in an increase of image density is in twofold. That is, in the first place, the toner layer 2a may be recharged more since the recording velocity $V_D$ is increased, which will contribute to increase image density. In the second place, on the donor roller 1 is formed an expanded latent image which is then contracted to the original size when transferred onto the transfer medium 12, so that the amount of tonor per unit area becomes increased after transfer thereby increasing image density. The reverse is true when the recording velocity $V_D$ is decreased from the reference value.

The recording apparatus shown in FIG. 1 was run under two different conditions to confirm the effects of the present invention.

Case I

Figure 3:
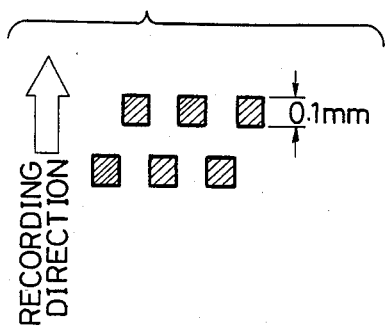
FIG. 3 is a schematic illustration showing the arrangement and size of the recording electrodes when the recording length is a reference length of 0.1 mm.

The following were the operating conditions.
Recording Velocity $V_D$: 25 mm/s
Transfer Velocity $V_P = V_T$: 25 mm/s
Number of Styluses: 2,048/205 mm
Resolving Power: 10 dots/mm
Stylus End Surface (Dot): 0.1 mm × 0.1 mm
Recording pulse Signal $E_P$: 300 V.
Pulse Width: 0.5 msec.
Single Line Recording Time: 4 msec.
Number of Blocks: 8
The styluses forming the recording electrodes 7 were arranged in a staggered fashion as shown in FIG. 3. Such 2,048 styluses were alternately arranged in two lines extending in the direction perpendicular to the recording direction and they were grouped into 8 blocks thereby allowing to carry out block operation in which the styluses are turned operative from block to block. The stylus end surface forming a picture element or dot had a square shape of 0.1 mm × 0.1 mm.

With the above conditions, the image density of an image formed on the transfer medium 12 was found to be 0.3. In order to increase the image density to the value of 1.0, it was required to use the pulse width of 2.0 msec. or more.

Case II

Figure 4:
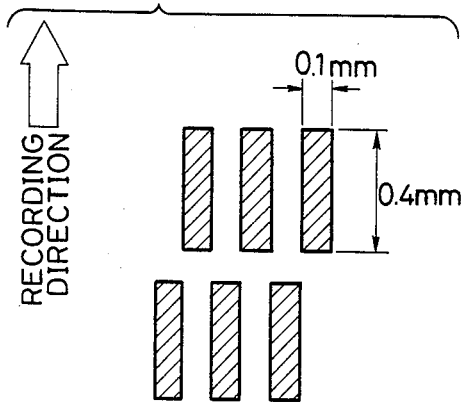
FIG. 4 is a schematic illustration showing the arrangement and size of the recording electrodes when the recording length is increased to 0.4 mm, four times of the reference value.

The operating conditions of this case were the same as those of the above Case I except otherwise indicated below.
Recording Velocity $V_D$: 100 mm/s
Transfer Velocity $V_P = V_T$: 25 mm/s
Stylus End Surface (Dot): 0.4 mm × 0.1 mm
As shown in FIG. 4, the stylus end surface had a rectangular shape of 0.4 mm × 0.1 mm with the longer sides aligned with the recording direction. In this case, the image density obtained was 1.3.

In the Case II, when the transfer velocity or peripheral velocity $V_T$ of the transfer roller 6 and thus the advancing velocity $V_P$ of the transfer paper 7 were set at 100 mm/s, which is equal to the recording velocity $V_D$, the image density was lowered to about 0.6, which is about twice as large as that of the Case I. This is because, as shown in FIG. 2, when the recording velocity $V_D$ increases from 25 mm/s to 100 mm/s, the charge-to-mass ratio (Q/M) of the toner layer 2a increases about twice as large in magnitude.

Figure 5:
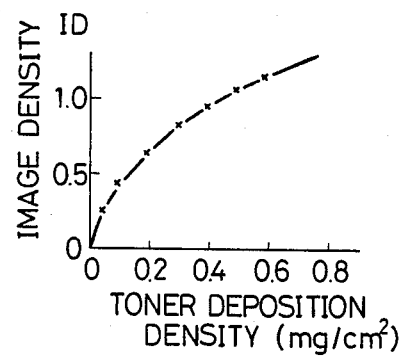
FIG. 5 is a graph showing the relationship between toner deposition density and image density.

It is to be noted that since the dot surface in Case II is elongated four times longer than that of Case I in the recording direction, the latent image formed on the donor roller 1 is expanded four times in the recording direction. However, by setting the recording velocity $V_D = 100$ mm/s and the transfer velocity $V_P = V_T = 25$ mm/s, which is ¼ of the recording velocity $V_{D1}$, the image is reduced in size in the recording direction to ¼, or original size, when transferred onto the transfer medium 12, thereby the toner deposition density on the transfer medium 12 will be increased by four times. It is to be noted that no proportionate relation exists between toner deposition density and image density, but there is a relation as shown in FIG. 5. Thus, even if the tonor deposition density is quadrupled, the image density is not proportionately increased but it gives the value of about 1.3.

Figure 6:
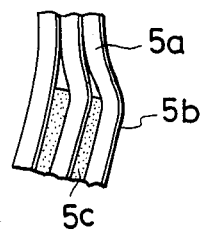
FIG. 6 is a perspective view on an enlarged scale showing a part of the recording head to be used in the present recording apparatus.
Figure 6A:
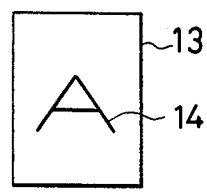
Figure 6B:
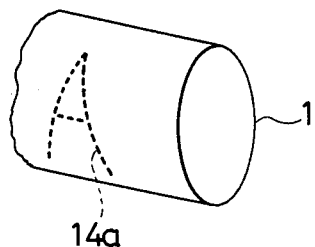
Figure 6C:
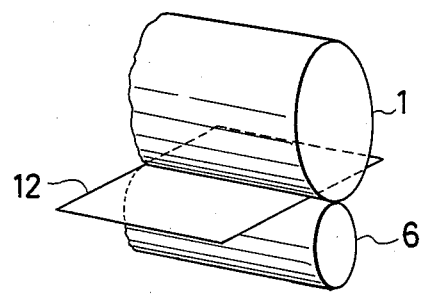
Figure 6:
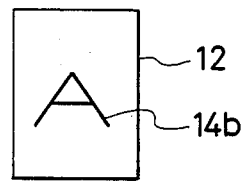

FIGS. 6 (a) through 6 (d) show how the expansion and contraction of an image takes place when the present apparatus is operated in the mode of Case II. FIG. 6(a) shows an original document 13 having thereon an original image 14. When electrical image signals representing the original image 14 are supplied to the multi-stylus head 5 having elongated recording styluses 7, the elongated latent image 14a is formed on the donor roller 1, as shown in FIG. 6(b). In this case, the letter "A" of 14a is elongated four times as that of the original image 14 without any change in the horizontal direction which is in parallel with the axis of rotation of the donor roller 1. Then, the latent image 14a is transferred to the recording or transfer paper 12 at the transfer region B defined between the donor roller 1 and transfer roller 6, as shown in FIG. 6(c). As a result, on the transfer paper 12 is formed a reproduced image 14b which is identical in shape and size with the original image 14.

It should thus be understood that the image density of a reproduced image may be significantly increased by increasing the recording velocity $V_D$ with or without increasing the recording length of a stylus end surface with maintaining the transfer velocity $V_T$ unchanged even if use is made of the same pulse signal for recording.

FIG. 6 shows the detailed structure of that part of the multi-stylus recording head 5 which forms its end surface during manufacture. A plurality of Mylar sheets 5a having thereon an Al-vapor deposited layer 5b and a combined thickness of 100 μm are arranged as spaced apart from one another and adhered to a copper plate 5C of 100 μm thickness. Such a combined structure is severed into a strip having the width of 0.4 mm thereby forming one of the paired recording lines as shown in FIG. 4.

Figure 7:
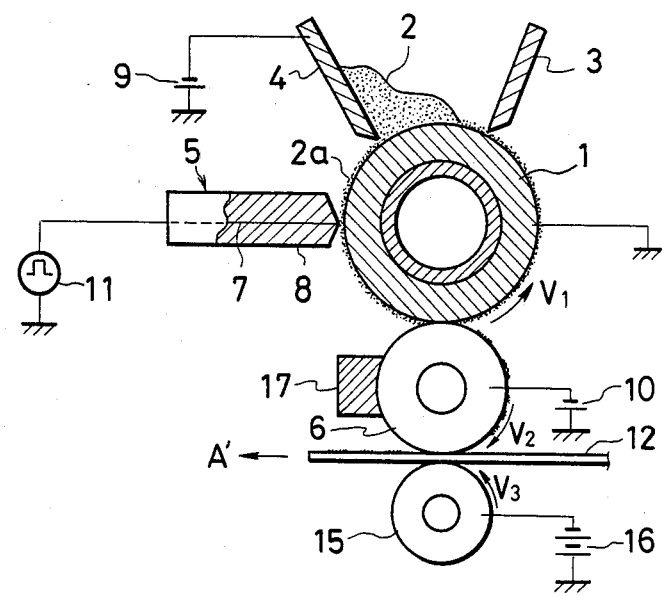
FIG. 7 is a schematic illustration showing another embodiment of the recording apparatus in accordance with the present invention.

FIG. 7 shows another embodiment of the present invention in which an additional roller 15 is provided in parallel with the transfer roller 6. With such a structure, the electrostatic latent image formed in the toner layer 2a on the donor roller 1 and having the positive polarity is once transferred onto the transfer roller 6 to which a negative potential is applied by means of a voltage source 10. The transferred, visible toner image thus formed on the transfer roller 6 is then retransferred onto the recording medium 12, which is preferably being advanced in the direction indicated by the arrow A' as transported in pressure contact between the rollers 6 and 15. In this case, it is preferably so structured that the contact between the roller 6 and the medium 12 allows slippage; whereas the back-up roller 15 does not slip against the medium 12. As shown, a negative potential, which is more negative than that applied to the transfer roller 6, is applied to the back-up roller 15 by means of a voltage source 16, so that the visible toner image formed on the transfer roller 6 may be retransferred onto the transfer medium 12, which is later subjected to a fixing operation.

In one mode, the donor roller 1 is driven to rotate counterclockwise with a peripheral velocity $V_1$ which is larger than the peripheral velocity $V_2$ of the transfer roller 6, which, in turn, is driven to rotate clockwise. When a latent image is formed on the donor roller 1, it is elongated along its circumference. However, due to the fact that the peripheral velocity $V_2$ is set slower than the peripheral velocity $V_1$, the transferred image formed on the transfer roller 6 is identical in shape and size with the original image. Therefore, the reproduced image thus formed on the transfer roller 6 has an increased image density as discussed previously. It should also be noted that when the donor roller 1 has a peripheral velocity smaller than that of the transfer roller 6, the level of background contamination is significantly reduced because of slippage between the two rollers 1 and 6 in contact each other. That is, if some toner or foreign materials exist in the background area, they will be removed owing to the rubbing contact between the two rollers 1 and 6.

The peripheral velocity $V_3$ of the back-up roller 15 is set equal to the peripheral velocity $V_2$ of the transfer roller 6 and thus the transfer medium 12 is advanced at the velocity of $V_2 = V_3$. Accordingly, the image on the transfer roller 6 is transferred onto the transfer medium 12 without any change in shape and size. As the transfer roller 6 rotates, the toner remaining on the roller 6 after transfer is removed by a cleaning device 17. It should also be noted that the toner image on the transfer roller 6 may be transferred to and at the same time fixed to the transfer medium 12 by increasing the pressing force of the back-up roller 15 against the transfer roller 6.

While the above provides a full and complete disclosure of the preferred embodiments of the present invention, various modifications, alternate constructions and equivalents may be employed without departing from the true spirit and scope of the invention. For example, polarities may be reversed in the above description. Thus, the above description and illustration should not be construed as limiting the scope of the invention, which is defined by the appended claims.

What is claimed is:

1. A recording apparatus comprising:
a toner carrier which is driven to move along a predetermined path through a transfer region at a first velocity;
means for forming a toner layer on a surface of said toner carrier, said toner layer being charged to a first polarity and having a predetermined thickness;
a recording head for selectively recharging said toner layer with a second polarity opposite to said first polarity thereby forming an electrostatic latent image having a desired pattern; and
means for advancing a transfer medium at a second velocity which is slower than said first velocity through a transfer region where said electrostatic latent image is transferred onto said transfer medium with an increase of image density.

2. The recording apparatus of claim 1 wherein said recording head has an elongated recording surface in the direction of relative motion between said toner carrier and said recording head.

3. The recording apparatus of claim 2 wherein said elongated recording surface is substantially determined by the ratio between said first and second velocities.

4. A recording apparatus comprising:
a first roller for carrying toner on a peripheral surface thereof, said first roller being driven to rotate at a first peripheral velocity;
means for forming a toner layer on said peripheral surface of said first roller, said toner layer being charged to a first polarity and having a predetermined thickness;
a recording head for selectively recharging said toner layer with a second polarity opposite to said first polarity thereby forming an electrostatic latent image having a desired charge pattern; and
a second roller disposed in parallel with said first roller and driven to rotate in the direction opposite to that of said first roller at a second peripheral velocity which is slower than said first peripheral velocity, whereby a transfer medium is passed between said first and second rollers at said second peripheral velocity thereby transferring said latent image onto said transfer medium with an increase of image density.

5. The recording apparatus of claim 4 wherein said recording head includes a plurality of recording electrodes arranged at least in a line along the peripheral surface of said first roller in parallel with the axis of rotation thereof and each of said recording electrodes has a recording length extending in the direction of relative motion between said electrodes and said first roller, said recording length being a reference length and said first peripheral velocity is selected from velocities including a reference velocity.

6. The recording apparatus of claim 5 wherein said plurality of electrodes are arranged in two lines alternately thereby forming a staggered arrangement.

7. The recording apparatus of claim 5 wherein said first peripheral velocity is other than said reference velocity.

8. The recording apparatus of claim 5 wherein said first peripheral velocity is a velocity determined by multiplying a positive real number to said reference velocity and said recording length is a length determined substantially by multiplying said positive real number to said reference length.

9. The recording apparatus of claim 8 wherein said positive real number is greater than unity.

10. The recording apparatus of claim 4 wherein said means for forming a toner layer includes a hopper containing therein a quantity of toner and supplying the toner to the peripheral surface of said first roller and a thickness control member for controlling the thickness of the toner layer formed on the peripheral surface of said first roller to a predetermined thickness.

11. The recording apparatus of claim 10 wherein said thickness control member is formed by a part of said hopper.

12. The recording apparatus of claim 10 further comprising means for applying a first potential to charge said toner layer to the first polarity.

13. The recording apparatus of claim 4 further comprising means for applying a second potential of said first polarity to said second roller.

14. A recording apparatus comprising:
a first roller for carrying toner on a peripheral surface thereof, said first roller being driven to rotate at a first peripheral velocity;
means for forming a toner layer on said peripheral surface of said first roller, said toner layer being charged to a first polarity and having a predetermined thickness;
a recording head for selectively recharging said toner layer with a second polarity opposite to said first polarity thereby forming an electrostatic latent image having a desired charge pattern;
a second roller disposed in parallel with said first roller and driven to rotate in the direction opposite to said first roller at a second peripheral velocity thereby transferring said latent image onto said peripheral surface of said second roller to form a visible image; and
a third roller disposed in parallel with said second roller and driven to rotate in the direction opposite to said second roller at a third peripheral velocity which is slower than said first peripheral velocity, whereby a transfer medium is passed between said second and third rollers thereby transferring said visible image on said second roller onto said transfer medium with an increase of image density.

15. The recording apparatus of claim 14 wherein said second peripheral velocity is equal to said first peripheral velocity.

16. The recording apparatus of claim 14 wherein said second peripheral velocity is equal to said third peripheral velocity.

* * * * *